(12) United States Patent
Sumiyoshi

(10) Patent No.: US 9,443,294 B2
(45) Date of Patent: Sep. 13, 2016

(54) IMAGE CORRECTION SYSTEM, IMAGE CORRECTION METHOD, AND COMPUTER PROGRAM PRODUCT

(71) Applicant: Shinichi Sumiyoshi, Kanagawa (JP)

(72) Inventor: Shinichi Sumiyoshi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/646,922

(22) PCT Filed: Nov. 18, 2013

(86) PCT No.: PCT/JP2013/081571
§ 371 (c)(1),
(2) Date: May 22, 2015

(87) PCT Pub. No.: WO2014/084148
PCT Pub. Date: Jun. 5, 2014

(65) Prior Publication Data
US 2015/0302560 A1 Oct. 22, 2015

(30) Foreign Application Priority Data

Nov. 27, 2012 (JP) .................. 2012-259033
Sep. 17, 2013 (JP) .................. 2013-192385

(51) Int. Cl.
*G06K 9/46* (2006.01)
*G06T 5/00* (2006.01)
(Continued)

(52) U.S. Cl.
CPC .................. *G06T 5/006* (2013.01); *G06K 9/52* (2013.01); *G06T 3/00* (2013.01); *G06T 3/60* (2013.01);
(Continued)

(58) Field of Classification Search
CPC ............ G06K 9/52; G06T 3/00; G06T 3/60; G06T 5/006; G09G 2360/147; G09G 3/001; H04N 5/217; H04N 5/23229; H04N 5/23258; H04N 9/3185; H04N 9/3194
USPC ..................................................... 382/203
See application file for complete search history.

(56) References Cited

U.S. PATENT DOCUMENTS

2002/0024640 A1 2/2002 Ioka
2007/0070207 A1 3/2007 Sakurai
(Continued)

FOREIGN PATENT DOCUMENTS

JP 2006-033357 2/2006
JP 2007-043545 2/2007
(Continued)

OTHER PUBLICATIONS

International Search Report issued Jan. 7, 2014 in PCT/JP2013/081571 filed Nov. 18, 2013.
(Continued)

*Primary Examiner* — Manuchehr Rahmjoo
(74) *Attorney, Agent, or Firm* — Oblon, McClelland, Maier & Neustadt, L.L.P.

(57) ABSTRACT

This invention is concerning an image correction system that includes an image-capturing unit configured to acquire a captured image by capturing a subject; a tilt recognition unit configured to recognize tilt of an image-capturing direction of the image-capturing unit relative to an image-capturing direction in which the image-capturing unit being directly opposite to the subject captures the subject; a first correction unit configured to generate a corrected image by correcting distortion in the captured image due to the tilt; and a second correction unit configured to acquire a corrected captured image by correcting non-linear distortion in the corrected image.

7 Claims, 17 Drawing Sheets

(51) Int. Cl.
  G09G 3/00      (2006.01)
  H04N 9/31      (2006.01)
  G06K 9/52      (2006.01)
  G06T 3/00      (2006.01)
  G06T 3/60      (2006.01)
  H04N 5/232     (2006.01)
  H04N 5/217     (2011.01)

(52) U.S. Cl.
  CPC .............. G09G 3/001 (2013.01); H04N 5/217 (2013.01); H04N 5/23229 (2013.01); H04N 9/3185 (2013.01); H04N 9/3194 (2013.01); *G09G 2360/147* (2013.01); *H04N 5/23258* (2013.01)

(56) References Cited

U.S. PATENT DOCUMENTS

2010/0021080 A1*  1/2010  Tamura ................ H04N 9/3194
                                                   382/275
2011/0228985 A1*  9/2011  Uchida ................. G06T 7/2006
                                                   382/103
2013/0057707 A1   3/2013  Hasegawa et al.

FOREIGN PATENT DOCUMENTS

JP    2009-206800    9/2009
JP    2013-065277    4/2013

OTHER PUBLICATIONS

Extended European Search Report issued on Nov. 12, 2015 in European Patent Application No. 13857913.1.

"Camera resectioning", Wikipedia, the free encyclopedia, XP055225227, Oct. 14, 2012, 4 Pages.

Takayuki Okatani, et al., "Autocalibration of a Projector-Screen-Camera System: Theory and Algorithm for Screen-to-Camera Homography Estimation", Proceedings of the Eight IEEE International Conference on Computer Vision, (ICCV). XP055224945, Oct. 13-16, 2003, 8 Pages.

* cited by examiner

GRID PATTERN IMAGE

INPUT IMAGE → PROJECTION → PROJECTED IMAGE

PROJECTED IMAGE → CAPTURE → CAPTURED IMAGE

CORRECTED INPUT IMAGE → PROJECTION → PROJECTED IMAGE AFTER CORRECTION

IMAGE CORRECTION SYSTEM, IMAGE CORRECTION METHOD, AND COMPUTER PROGRAM PRODUCT

TECHNICAL FIELD

The present invention relates to an image correction system, an image correction method, and a computer program product.

BACKGROUND ART

It is known that there are two types of distortion, linear distortion (trapezoidal distortion) and non-linear distortion, that can occur in a projected image projected by a projection apparatus such as a projector. Linear distortion occurs, for example, when the projection apparatus deviates from a position directly opposite to a projection surface. In other words, linear distortion occurs when a projection apparatus designed to be disposed in a position perpendicular to a projection surface is not directly opposite to the projection surface.

Non-linear distortion occurs, for example, when a projection surface such as a hanging projector screen is uneven. In general, an uneven projection surface such as a hanging projector screen lacks linearity, thus non-linear distortion occurs.

A projection system (projector and camera system) that includes a projection apparatus and an image-capturing apparatus is a well-known technology to correct distortion in a projected image. For example, this technology corrects distortion in a projected image projected by the projection apparatus such as a projector on the basis of a captured image captured by a portable image-capturing apparatus (such as a digital camera, a web camera, and a camera built in a mobile phone or a smart phone, and hereinafter referred to as an "external camera").

Patent document 1 is known as a technical document that discloses a technique to correct distortion in a projected image. Patent document 1 discloses an invention to correct distortion in a projected image by using a captured image captured by a mobile phone with a built-in camera.

However, linear distortion occurs in a corrected projected image in some cases when a captured image acquired by an image-capturing apparatus capturing a projected image is used, for example, in order to correct distortion in the projected image due to unevenness of a projection surface.

CITATION LIST

Patent Literature

[Patent Literature 1] Japanese Patent Application Laid-open No. 2006-033357

DISCLOSURE OF INVENTION

Problem to be Solved by the Invention

The present invention has been made in view of the disadvantage described above, and it is an object of the present invention to provide an image correction system, an image correction method and a computer program product with which, if a captured image acquired by an image-capturing apparatus capturing a subject is distorted, distortion of the subject contained in the captured image can be eliminated by utilizing the captured image.

Means for Solving Problem

To achieve the object, an image correction system according to the present invention includes: an image-capturing unit configured to acquire a captured image by capturing a subject; a tilt recognition unit configured to recognize tilt of an image-capturing direction of the image-capturing unit relative to an image-capturing direction in which the image-capturing unit being directly opposite to the subject captures the subject; a first correction unit configured to generate a corrected image by correcting distortion in the captured image due to the tilt; and a second correction unit configured to acquire a corrected captured image by correcting non-linear distortion in the corrected image.

An image correction method according to the present invention comprising: acquiring, by an image-capturing unit, a captured image by capturing a subject; recognizing, by a tilt recognition unit, tilt of an image-capturing direction of the image-capturing unit relative to an image-capturing direction in which the image-capturing unit being directly opposite to the subject captures the subject; generating, by a first correction unit, a corrected image by correcting distortion in the captured image due to the tilt; and acquiring, by a second correction unit, a corrected captured image by correcting non-linear distortion in the corrected image.

A computer program product according to the present invention comprising a non-transitory computer-usable medium having a computer program that causes a computer to function as: an image-capturing unit configured to acquire a captured image by capturing a subject; a tilt recognition unit configured to recognize tilt of an image-capturing direction of the image-capturing unit relative to an image-capturing direction in which the image-capturing unit being directly opposite to the subject captures the subject; a first correction unit configured to generate a corrected image by correcting distortion in the captured image due to the tilt; and a second correction unit configured to acquire a corrected captured image by correcting non-linear distortion in the corrected image.

Effect of the Invention

According to the present invention, if a captured image acquired by an image-capturing apparatus capturing a subject is distorted, the distortion of the subject contained in the captured image can be eliminated by utilizing the captured image.

BEST MODES FOR CARRYING OUT THE INVENTION

Embodiments will now be described in detail below of an image correction system, an image correction method and a computer program product with reference to the accompanying drawings.

First Embodiment

Figure 1:
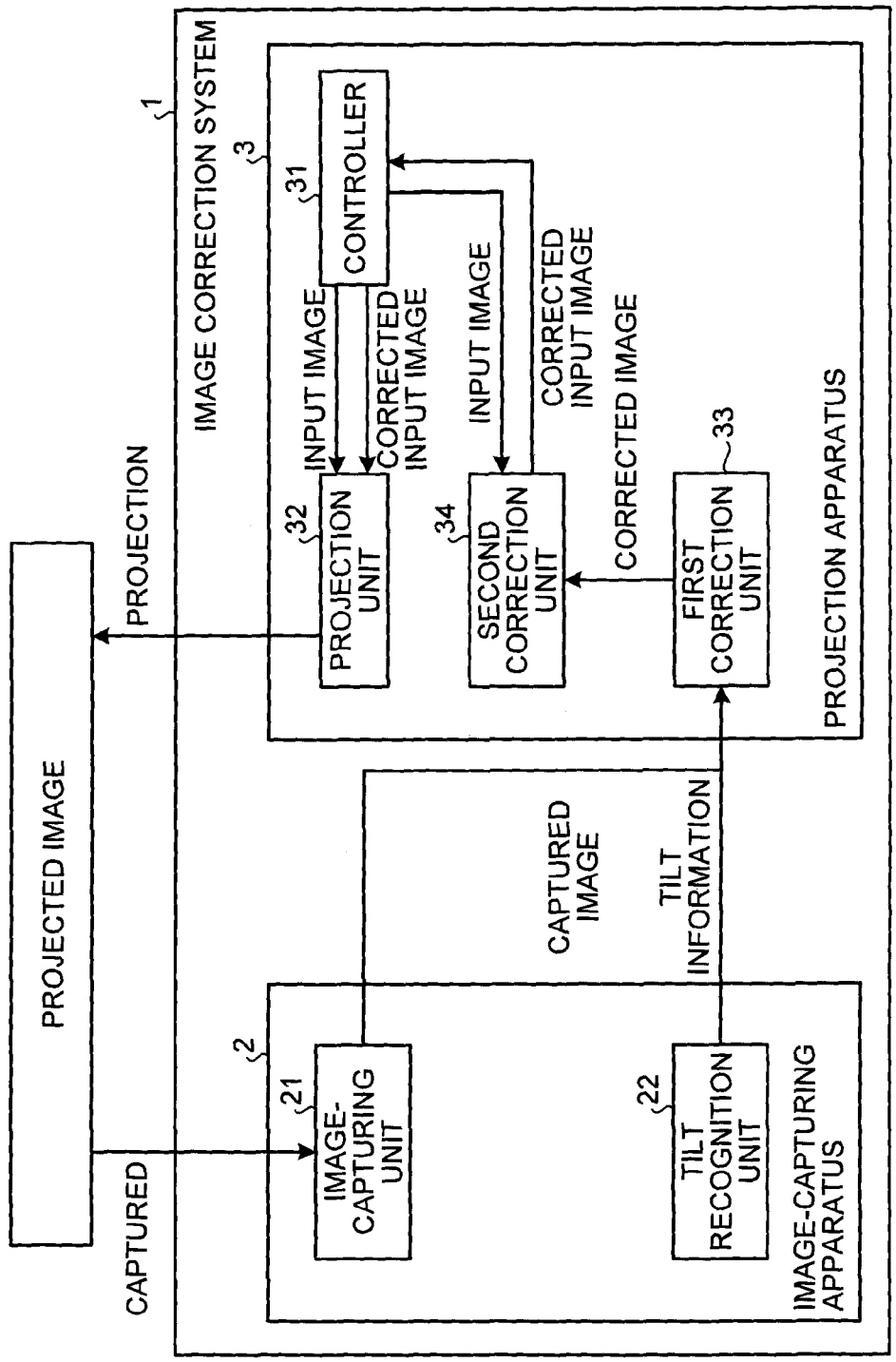
FIG. 1 is a block diagram illustrating an example of a configuration of functional blocks in an image correction system according to a first embodiment.

FIG. 1 is a block diagram illustrating an example of a configuration of functional blocks in an image correction system 1 according to a first embodiment. The image correction system 1 of the first embodiment includes an image-capturing apparatus 2 and a projection apparatus 3. The image-capturing apparatus 2 includes an image-capturing unit 21 and a tilt recognition unit 22. The projection apparatus 3 includes a controller 31, a projection unit 32, a first correction unit 33, and a second correction unit 34.

The image-capturing unit 21 captures a projected image projected by the projection unit 32. The image-capturing unit 21 transmits the captured image to the first correction unit 33.

The tilt recognition unit 22 recognizes tilt of an image-capturing direction of the image-capturing unit 21 relative to an image-capturing direction in which the image-capturing unit 21 being directly opposite to a projection surface captures the projection surface. The tilt recognition unit 22 recognizes the tilt with an accelerometer when the image-capturing unit 21 captures a projected image. The accelerometer, for example, provides such information as the image-capturing unit 21 is tilted by 10 degrees relative to the ground. The tilt recognition unit 22 transmits information indicating the tilt (hereinafter referred to as "tilt information") to the first correction unit 33.

The accelerometer will be described. When the accelerometer is a three-axis accelerometer, trapezoidal distortion (linear distortion) in the longitudinal direction in a captured image can be corrected. When the accelerometer is a four-axis to six-axis accelerometer, trapezoidal distortion (linear distortion) in the lateral direction can also be corrected, and correction of gyro-like spin is also possible.

In general, a projection surface such as a screen on which the projection unit 32 projects an image is perpendicular to the ground. This can lead to an assumption that, when an external camera (image-capturing apparatus 2) is directly opposite to the projection surface, the external camera (image-capturing apparatus 2) is perpendicular to the ground. Therefore, a corrected image acquired by correcting tilt of a captured image by using tilt information recognized at the tilt recognition unit 22 is identical to a captured image (a captured image captured from the front) that is acquired when the external camera being directly opposite to the projection surface captures the projection surface such as a screen.

The image-capturing apparatus 2 may transmit a captured image and tilt information to the projection apparatus 3 in either of a wireless or wired manner.

The controller 31 inputs, into the projection unit 32, an input image to be projected by the projection unit 32 as a projected image. The controller 31 also inputs the input image into the second correction unit 34 in order to correct non-linear distortion in the input image. The controller 31 receives, from the second correction unit 34, a corrected input image that is generated by correcting the non-linear distortion in the input image. The controller 31 then inputs the corrected input image into the projection unit 32.

The projection unit 32 projects the input image or the corrected input image as a projected image on a projection surface. The projection surface is, for example, a screen, a wall or a white board. The input image and the corrected input image will be described later in detail.

The first correction unit 33 generates a corrected image from a captured image on the basis of tilt information. The first correction unit 33 transmits the corrected image to the second correction unit 34. The first correction unit 33 will be described later in detail.

The second correction unit 34 corrects non-linear distortion in the input image on the basis of the corrected image, and generates a corrected input image. The second correction unit 34 will be described later in detail.

Figure 2:
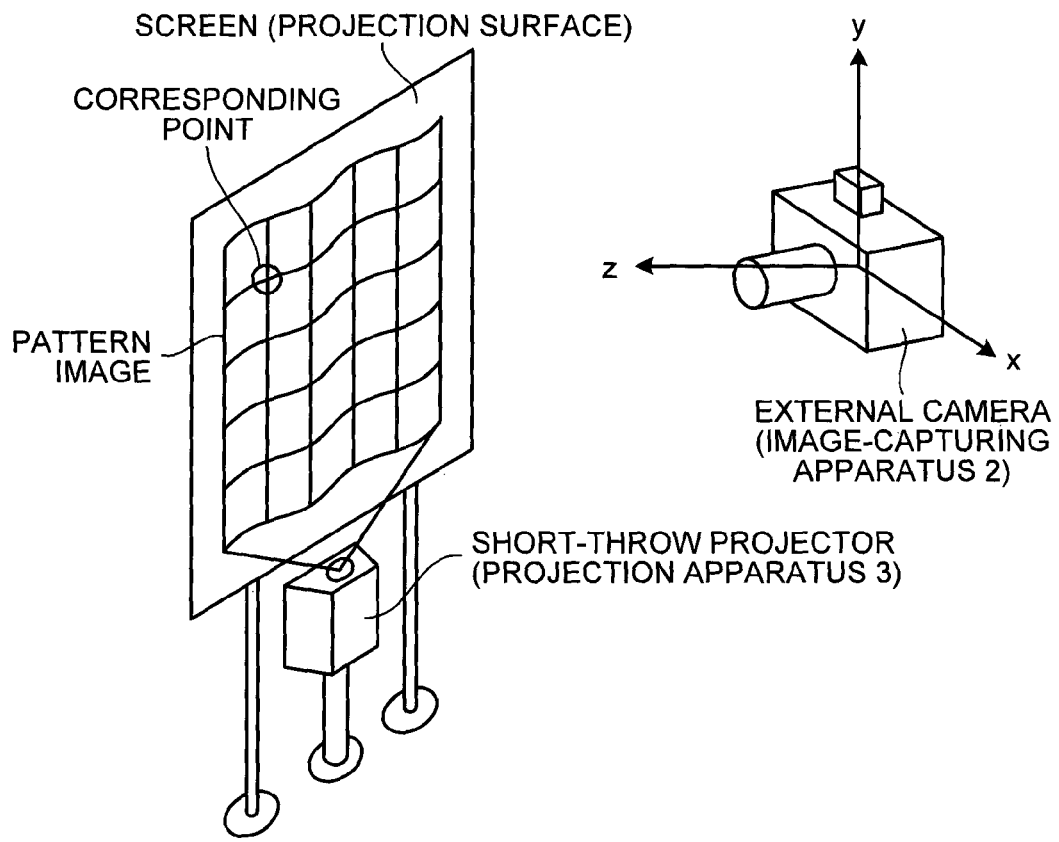
FIG. 2 is a diagram illustrating an example of an embodiment of the image correction system according to the first embodiment.

FIG. 2 is a diagram illustrating an example of an embodiment of the image correction system 1 according to the first embodiment. The image correction system 1 in FIG. 2 is implemented by an external camera (image-capturing apparatus 2) and a short-throw projector (projection apparatus 3). The short-throw projector (projection apparatus 3) is projecting a pattern image for correcting distortion in a projected image on a screen (projection surface). Intersections of the lines contained in the pattern image in FIG. 2 are used by the second correction unit 34, as corresponding points for associating a corrected image generated by the first correction unit 33 with an input image.

Figure 3:
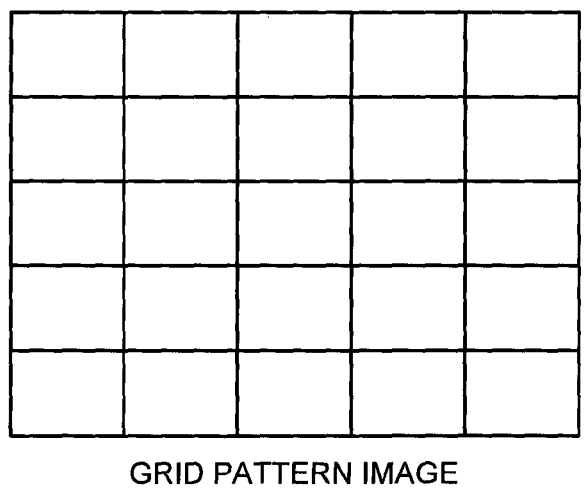
FIG. 3 is a diagram illustrating an example of a pattern image projected by a projection unit of the image correction system according to the first embodiment.

FIG. 3 is a diagram illustrating an example of a pattern image projected by the projection unit 32 of the image correction system 1 according to the first embodiment. FIG. 3 is an example of a pattern image with a grid pattern.

In the example of FIG. 2, the short-throw projector (projection apparatus 3) is projecting the pattern image. In the example of FIG. 2, non-linear distortion occurs in the projected pattern image because of the distortion of the screen (projection surface). The second correction unit 34 corrects the non-linear distortion in the projected image by using the intersections of the lines contained in the grid pattern image as the corresponding points between a corrected image and an input image.

Figure 4:
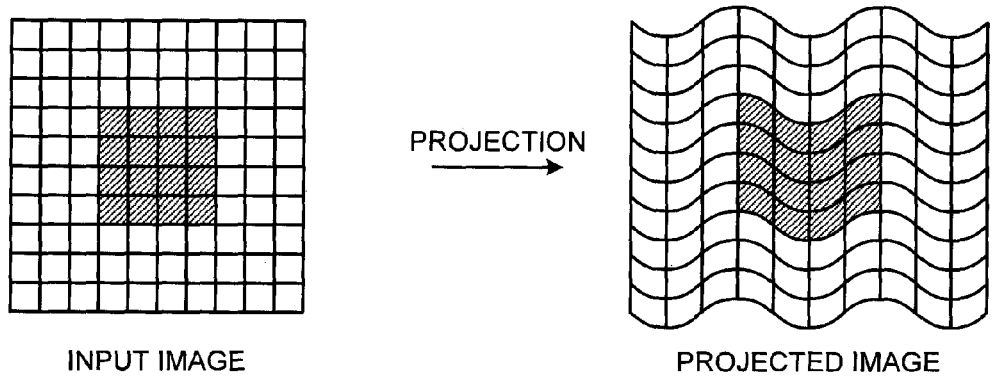
FIG. 4 is a diagram illustrating an example of non-linear distortion in a projected image projected by the projection unit of the image correction system according to the first embodiment.

Described are an input image input by the controller 31 into the projection unit 32, and distortion in a projected image. FIG. 4 is a diagram illustrating an example of non-linear distortion in a projected image projected by the projection unit 32 of the image correction system 1 according to the first embodiment. The example of FIG. 4 illustrates a case in which a square is projected on the projection surface. In the example of FIG. 4, non-linear distortion occurs in the square of the projected image because of the distortion of the projection surface.

When the image-capturing unit 21 acquires a captured image to detect this non-linear distortion, there is a case in which linear distortion occurs in the captured image because the image-capturing unit 21 deviates from a position directly opposite to the projection surface.

Figure 5:
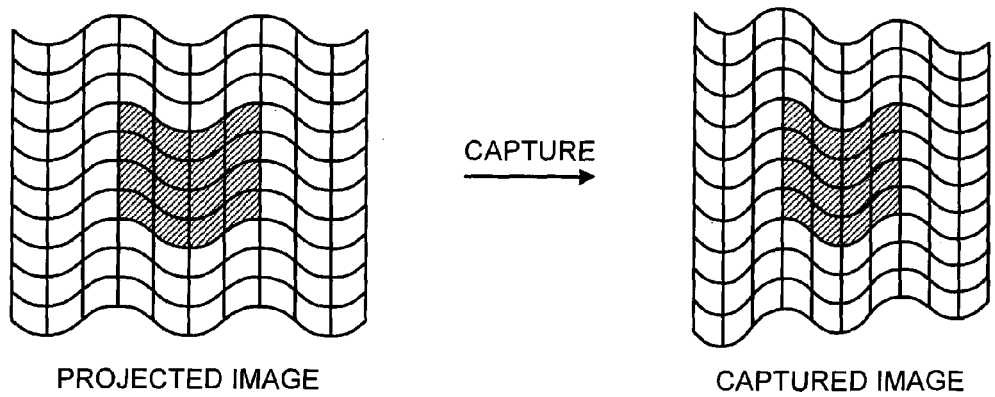
FIG. 5 is a diagram illustrating an example of a case in which linear distortion and non-linear distortion are contained in a captured image captured by an image-capturing unit of the image correction system according to the first embodiment.

FIG. 5 is a diagram illustrating an example of a case in which linear distortion and non-linear distortion are contained in a captured image captured by the image-capturing unit 21 of the image correction system 1 according to the first embodiment. The example of the captured image in FIG. 5 is acquired, for example, when the external camera (image-capturing apparatus 2) rotates horizontally to the ground in the right direction about the y-axis of the coordinate axes of the external camera (image-capturing apparatus 2) in FIG. 2, and deviates from a position directly opposite to the screen (projection surface).

The first correction unit 33 corrects a captured image containing linear distortion and non-linear distortion as illustrated in FIG. 5 by eliminating the linear distortion due to deviation of the image-capturing unit 21 from a position directly opposite to the projection surface, and generates a corrected image from the captured image.

Figure 6:
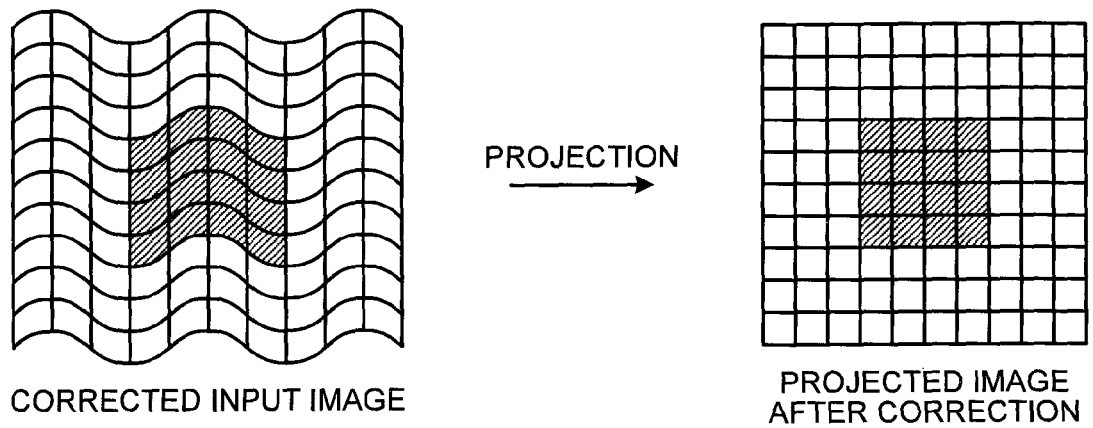
FIG. 6 is a diagram illustrating an example of a projected image after correction projected by the projection unit of the image correction system according to the first embodiment.

FIG. 6 is a diagram illustrating an example of a projected image after correction projected by the projection unit 32 of the image correction system 1 according to the first embodiment. The second correction unit 34 generates a corrected input image on the basis of the input image and the corrected image generated by the first correction unit 33 from the captured image. When the projection unit 32 projects the corrected input image, a projected image after correction is displayed on the projection surface. The projected image after correction is identical to the input image.

Figure 7:
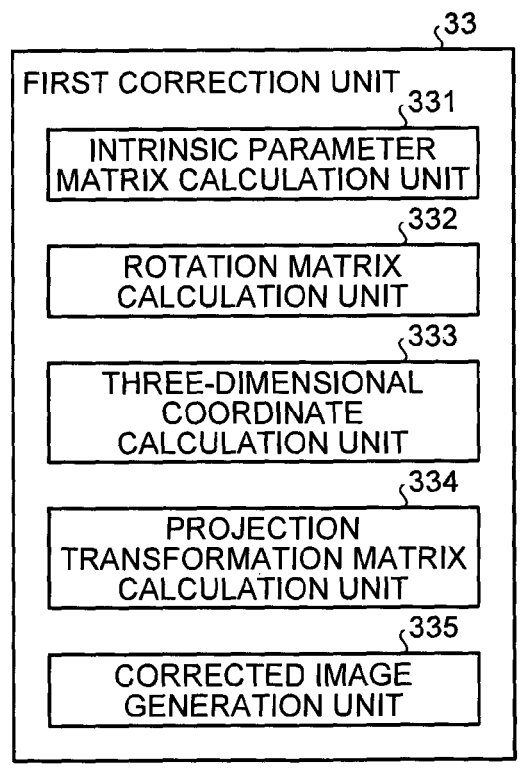
FIG. 7 is a diagram illustrating an example of functional blocks in a first correction unit of the image correction system according to the first embodiment.

Next, described in detail is the first correction unit 33 in the image correction system 1 according to the first embodiment. FIG. 7 is a diagram illustrating an example of functional blocks in the first correction unit 33 of the image correction system 1 of the first embodiment. The first correction unit 33 includes an intrinsic parameter matrix calculation unit 331, a rotation matrix calculation unit 332, a three-dimensional coordinate calculation unit 333, a projection transformation matrix calculation unit 334, and a corrected image generation unit 335.

The intrinsic parameter matrix calculation unit 331 calculates an intrinsic parameter matrix of the image-capturing unit 21. First, the intrinsic parameter matrix is described.

[Math. 1]

$$A = \begin{pmatrix} f & 0 & cx \\ 0 & f & cy \\ 0 & 0 & 1 \end{pmatrix} \quad (1)$$

Formula 1 is an intrinsic parameter matrix A. Described are components of the intrinsic parameter matrix A of Formula 1, where f denotes the focal length of the image-capturing unit 21, cx denotes x-coordinate of the principal point (cx, cy) of the image-capturing unit 21, and cy denotes y-coordinate of the principal point (cx, cy) of the image-capturing unit 21.

The intrinsic parameter matrix calculation unit 331 needs to acquire the focal length f and the principal point (cx, cy) of the image-capturing unit 21 in order to calculate the intrinsic parameter matrix A.

The intrinsic parameter matrix calculation unit 331 may acquire the focal length f and the principal point (cx, cy) on the basis of exchangeable image file format (Exif) information that is tag information of a captured image. The intrinsic parameter matrix calculation unit 331 may acquire the focal length f and the principal point (cx, cy) by camera calibration of the image-capturing unit 21.

The intrinsic parameter matrix A is used when the three-dimensional coordinate calculation unit 333 calculates, from two-dimensional coordinates of the captured image, three-dimensional coordinates in the real space corresponding to the two-dimensional coordinates.

The rotation matrix calculation unit 332 acquires tilt information from the tilt recognition unit 22. The tilt information includes information indicating a tilt θ of an image-capturing direction of the image-capturing unit 21 relative to an image-capturing direction in which the image-capturing unit 21 being directly opposite to the projection surface captures the projection surface. The rotation matrix calculation unit 332 calculates a rotation matrix R representing coordinate transformation that rotates coordinates by just the tilt θ.

Figure 8:
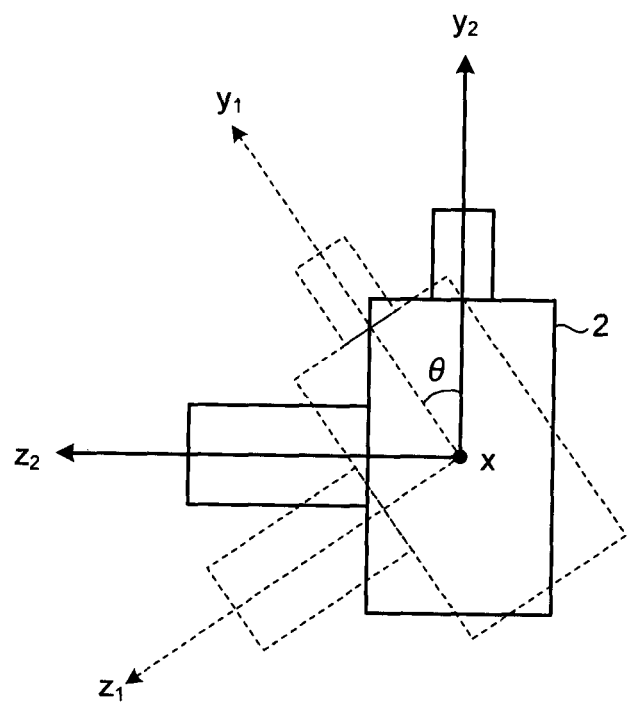
FIG. 8 is a diagram illustrating an example of tilt, relative to a projection surface, of the image-capturing unit of the image correction system according to the first embodiment.

The rotation matrix R will now be described. FIG. 8 is a diagram illustrating an example of the tilt θ, relative to the projection surface, of the image-capturing unit 21 of the image correction system 1 according to the first embodiment. The example of FIG. 8 illustrates a case in which an image-capturing direction (z-axis direction) of the image-capturing apparatus 2 is rotated by just the tilt θ around the x-axis so that the image-capturing unit 21 is directly opposite to the projection surface. In FIG. 8, x, $y_1$, and $z_1$ denote the coordinate axes before rotation by just the tilt θ, and x, $y_2$, and $z_2$ denote the coordinate axes after rotation by just the tilt θ.

Coordinates (x, $y_2$, $z_2$) can be calculated from the following formula by using the rotation matrix R that represents rotation by just the tilt θ.

[Math. 2]

$$\begin{pmatrix} x \\ y_2 \\ z_2 \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} x \\ y_1 \\ z_1 \end{pmatrix} \quad (2)$$

The rotation matrix calculation unit 332 calculates a matrix that satisfies Formula 2 as the rotation matrix R.

The three-dimensional coordinate calculation unit 333 calculates three-dimensional coordinates corresponding to coordinates of a captured image by perspective projection transformation in which the coordinates of the captured image and the intrinsic parameter matrix A of the image-capturing unit 21 are used. Perspective projection transformation will now be described. Capturing a projected image by the image-capturing unit 21 corresponds to an operation of transforming the three-dimensional coordinates in the real space into the two-dimensional coordinates in the captured image. This transformation is called perspective projection transformation. Perspective projection transformation can be represented by a perspective projection transformation matrix P of the image-capturing unit 21. The perspective projection transformation matrix P is expressed by the following formula.

[Math. 3]

$$P = A[Rt] = \begin{pmatrix} f & 0 & cx \\ 0 & f & cy \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \quad (3)$$

The matrix A in Formula 3 is the above-mentioned intrinsic parameter matrix of the image-capturing unit 21. A matrix [Rt] is an extrinsic parameter matrix. The extrinsic parameter matrix represents rotation and translation of the image-capturing unit 21.

When the image-capturing unit 21 is tilted by just the tilt θ as illustrated in FIG. 8 and captures a projected image, a perspective projection transformation matrix $P_1$ is expressed by the following formula.

[Math. 4]

$$P_1 = \begin{pmatrix} f & 0 & cx \\ 0 & f & cy \\ 0 & 0 & 1 \end{pmatrix} \begin{pmatrix} 1 & 0 & 0 & 0 \\ 0 & \cos\theta & -\sin\theta & 0 \\ 0 & \sin\theta & \cos\theta & 0 \end{pmatrix} \quad (4)$$

Formula 4 defines t=0 because the image-capturing unit 21 itself is the origin, and because the image-capturing unit 21 rotates about the origin.

The relation between the three-dimensional coordinates in the real space and the two-dimensional coordinates in the captured image can be represented as follows.

[Math. 5]

$$\begin{pmatrix} x_p \\ y_p \\ 1 \end{pmatrix} \cong \begin{pmatrix} f & 0 & cx \\ 0 & f & cy \\ 0 & 0 & 1 \end{pmatrix} \begin{pmatrix} 1 & 0 & 0 & 0 \\ 0 & \cos\theta & -\sin\theta & 0 \\ 0 & \sin\theta & \cos\theta & 0 \end{pmatrix} \begin{pmatrix} X \\ Y \\ Z \\ 1 \end{pmatrix} \quad (5)$$

Formula 5 represents equality except for scale. That is, Formula 5 represents equality in a homogeneous coordinate system.

When the image-capturing unit 21 being directly opposite to the projection surface captures the projection surface, a perspective projection transformation matrix $P_2$ is expressed by the following formula.

[Math. 6]

$$P_2 = \begin{pmatrix} f & 0 & cx \\ 0 & f & cy \\ 0 & 0 & 1 \end{pmatrix} \begin{pmatrix} 1 & 0 & 0 & 0 \\ 0 & 1 & 0 & 0 \\ 0 & 0 & 1 & 0 \end{pmatrix} \quad (6)$$

The relation between the three-dimensional coordinates in the real space and the two-dimensional coordinates in the captured image can be represented as follows.

[Math. 7]

$$\begin{pmatrix} x_1 \\ y_1 \\ 1 \end{pmatrix} \cong \begin{pmatrix} f & 0 & cx \\ 0 & f & cy \\ 0 & 0 & 1 \end{pmatrix} \begin{pmatrix} 1 & 0 & 0 & 0 \\ 0 & 1 & 0 & 0 \\ 0 & 0 & 1 & 0 \end{pmatrix} \begin{pmatrix} X \\ Y \\ Z \\ 1 \end{pmatrix} \quad (7)$$

In general, Formula 7 is equivalent to Formula 8 below. In Formula 7, R is defined as the identity matrix, and t is defined as 0. Thus, Formula 8 below defines R=E (identity matrix) and t=0.

[Math. 8]

$$\begin{cases} \begin{pmatrix} x \\ y \\ z \end{pmatrix} = R \begin{pmatrix} X \\ Y \\ Z \end{pmatrix} + t \\ x' = x/z \\ y' = y/z \\ x_1 = f*x' + cx \\ y_1 = f*y' + cy \end{cases} \quad (8)$$

The three-dimensional coordinate calculation unit 333 calculates three-dimensional coordinates in the real space corresponding to the coordinates of the captured image by using an inverse transformation matrix $P_1^{-1}$ that is the inverse of the perspective projection transformation matrix $P_1$. The three-dimensional coordinate calculation unit 333 does not need to calculate the corresponding three-dimensional coordinates in the real space with respect to all the points in the two-dimensional coordinates of the captured image. In other words, the three-dimensional coordinate calculation unit 333 may calculate corresponding points in the three-dimensional coordinates corresponding to the points in the captured image as many a number as needed (four) to calculate a projection transformation matrix H to be described later.

The projection transformation matrix calculation unit 334 calculates the projection transformation matrix H that transforms the coordinates of the captured image into coordinates of the corrected image. The projection transformation matrix H is used by the corrected image generation unit 335 to calculate the coordinates of the corrected image corresponding to the coordinates of the captured image.

Figure 9:
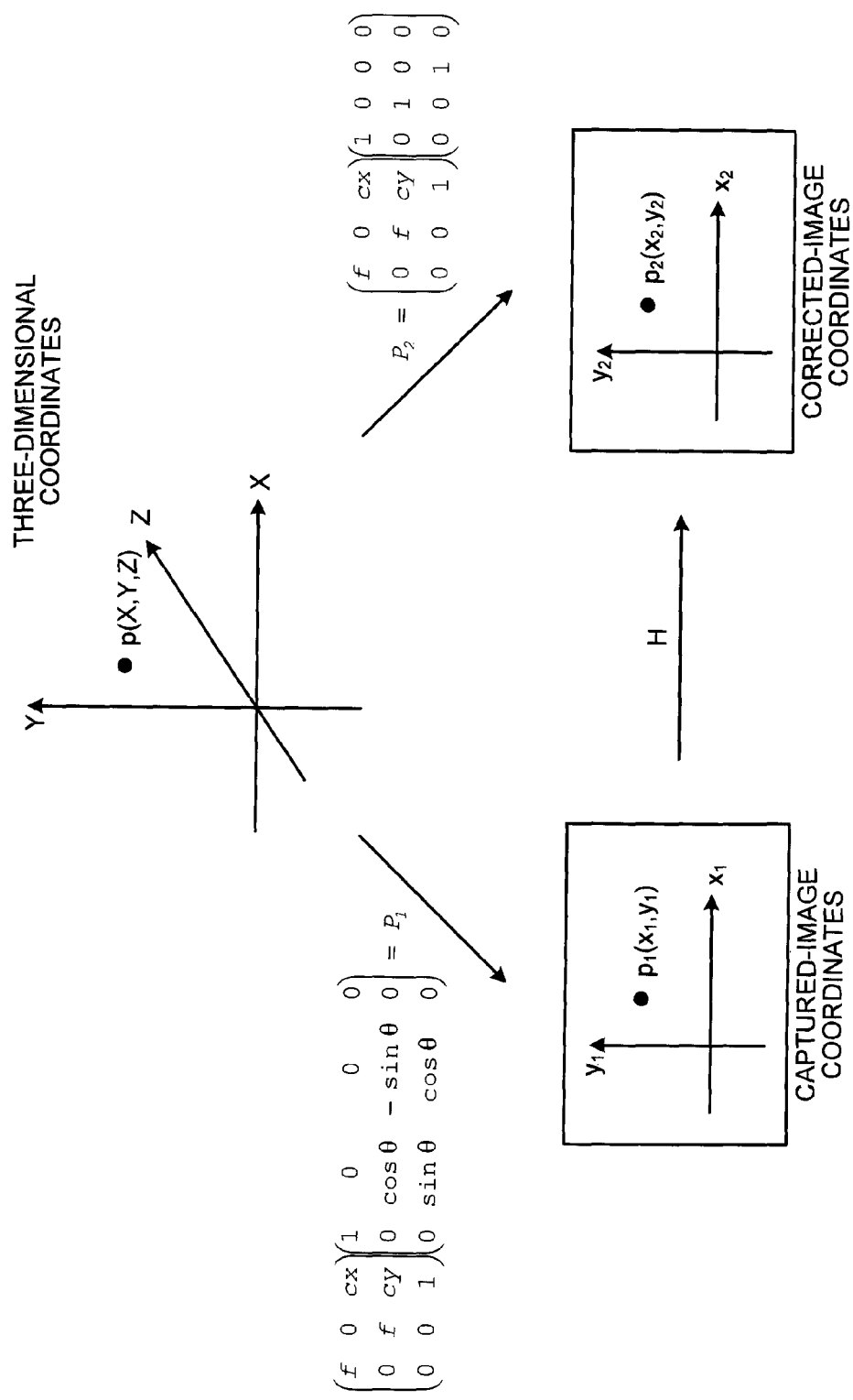
FIG. 9 is a diagram for explaining an example of a calculation method of a projection transformation matrix calculated by a projection transformation matrix calculation unit of the image correction system according to the first embodiment.

FIG. 9 is a diagram for explaining an example of a calculation method of the projection transformation matrix H calculated by the projection transformation matrix calculation unit 334 of the image correction system 1 according to the first embodiment. The projection transformation matrix H is expressed by the following formula.

[Math. 9]

$$p_2 \cong H p_1 \quad (9)$$

[Math. 10]

$$\begin{pmatrix} x_2 \\ y_2 \\ 1 \end{pmatrix} \cong \begin{pmatrix} h_1 & h_2 & h_3 \\ h_4 & h_5 & h_6 \\ h_7 & h_8 & 1 \end{pmatrix} \begin{pmatrix} x_1 \\ y_1 \\ 1 \end{pmatrix} \quad (10)$$

Formula 9 and Formula 10 represent equality except for scale. That is, Formula 9 and Formula 10 represent equality in a homogeneous coordinate system.

Calculating coefficients of the projection transformation matrix H results in calculating Formula 11 below.

[Math. 11]

$$\begin{cases} x_2 = \dfrac{h_1 x_1 + h_2 y_1 + h_3}{h_7 x_1 + h_8 y_1 + 1} \\ y_2 = \dfrac{h_4 x_1 + h_5 y_1 + h_6}{h_7 x_1 + h_8 y_1 + 1} \end{cases} \quad (11)$$

Formula 11 includes eight unknown coefficients $h_1$ to $h_8$. Formula 11 is obtained for each pair of coordinates $(x_1, y_1)$ of the captured image and coordinates $(x_2, y_2)$ of the corrected image corresponding to the coordinates $(x_1, y_1)$ of the captured image. In order to determine the eight unknown coefficients $h_1$ to $h_8$, information on at least four points of the corresponding points in the corrected image corresponding to the points in the captured image. The coordinates $(x_2, y_2)$ of the corrected image corresponding to the coordinates $(x_1, y_1)$ of the captured image can be calculated by applying the perspective projection transformation matrix $P_2$ to the three-dimensional coordinates in the real space corresponding to the above-described coordinates of the captured image.

The projection transformation matrix calculation unit 334 may calculate the projection transformation matrix H by the least-square method that uses a plurality of pieces of information on the corresponding points in the corrected image corresponding to the points in the captured image. Thereby, if the above-described corresponding points acquired by the perspective projection transformation matrix calculation unit 334 contain some errors with respect to correspondence, a projection transformation matrix H can be calculated that contains minimum errors. The least-square method is not the only method for reducing the effect of errors with respect to correspondence, and other methods can be used for this purpose.

The corrected image generation unit 335 generates a corrected image by applying the projection transformation matrix H to all the pixel coordinates in the captured image.

Figure 10:
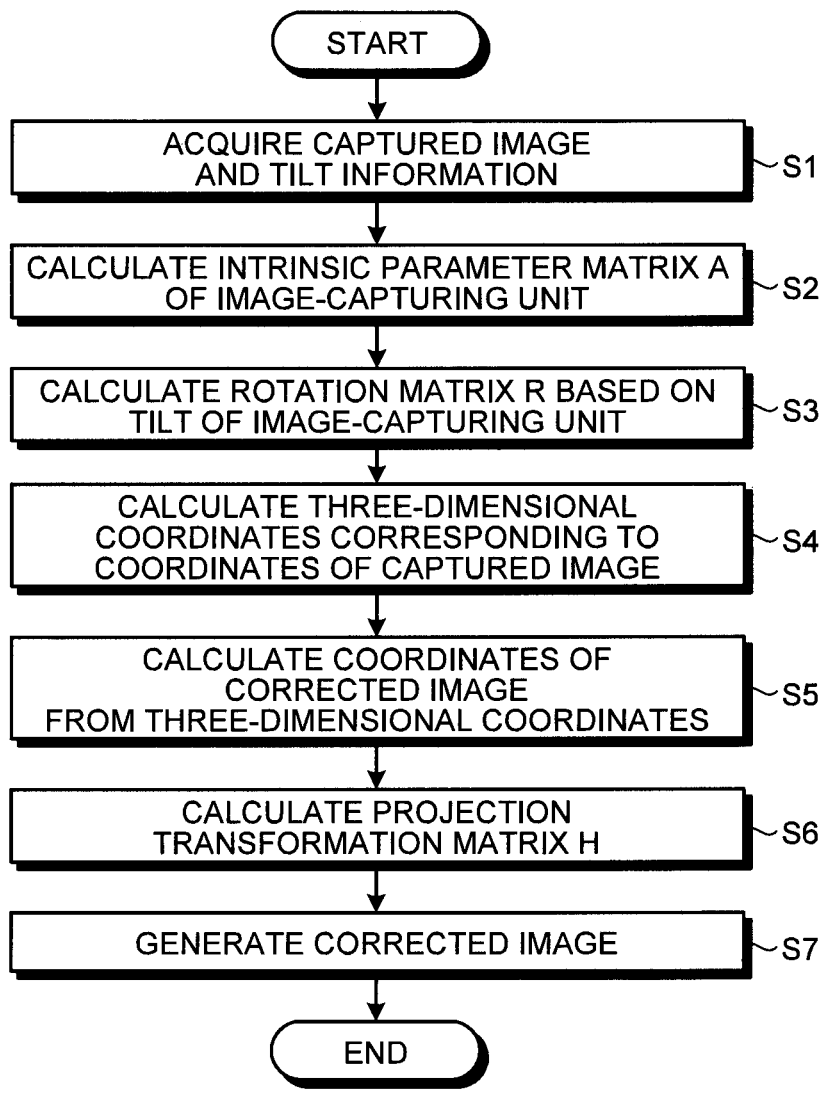
FIG. 10 is a flowchart for explaining an example of a generation method of a corrected image by the image correction system according to the first embodiment.

FIG. 10 is a flowchart for explaining an example of a generation method of the corrected image by the image correction system 1 according to the first embodiment.

The first correction unit 33 receives a captured image from the image-capturing unit 21. The first correction unit 33 also receives tilt information from the tilt recognition unit 22 (Step S1). The intrinsic parameter matrix calculation unit 331 calculates an intrinsic parameter matrix A of the image-capturing unit 21 on the basis of Exif information that is tag information of the captured image (Step S2). The rotation matrix calculation unit 332 calculates a rotation matrix R on the basis of the tilt information (Step S3).

The three-dimensional coordinate calculation unit 333 calculates a perspective projection transformation matrix $P_1$ from the intrinsic parameter matrix A of the image-capturing unit 21 and the rotation matrix R. The three-dimensional coordinate calculation unit 333 calculates three-dimensional coordinates corresponding to coordinates of the captured image by applying an inverse transformation matrix $P_1^{-1}$ that is the inverse of the perspective projection transformation matrix $P_1$ to the coordinates of the captured image (Step S4). The projection transformation matrix calculation unit 334 calculates coordinates of a corrected image corresponding to the three-dimensional coordinates by applying a perspective projection transformation matrix $P_2$ to the three-dimensional coordinates (Step S5).

At Step S4 and Step S5, the first correction unit 33 calculates corresponding points of the coordinates in the corrected image corresponding to points of the coordinates in the captured image. The projection transformation matrix calculation unit 334 calculates a projection transformation matrix H by the least-square method, in which the corresponding points of the coordinates in the corrected image corresponding to the points of the coordinates in the captured image is used (Step S6). The corrected image generation unit 335 generates the corrected image by applying the projection transformation matrix H to all the pixel coordinates in the captured image (Step S7).

Figure 11:
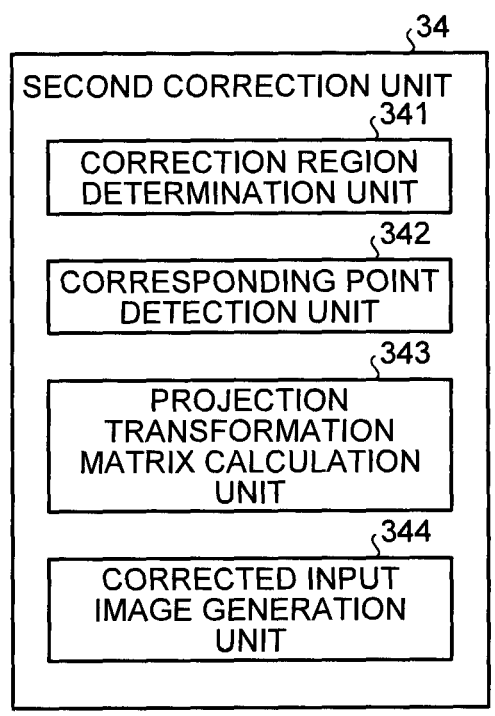
FIG. 11 is a diagram illustrating an example of functional blocks in a second correction unit of the image correction system according to the first embodiment.

Next, described is the second correction unit 34 in the image correction system 1 according to the first embodiment. FIG. 11 is a diagram illustrating an example of functional blocks in the second correction unit 34 of the image correction system 1 of the first embodiment. The second correction unit 34 includes a correction region determination unit 341, a corresponding point detection unit 342, a projection transformation matrix calculation unit 343, and a corrected input image generation unit 344.

Figure 12:
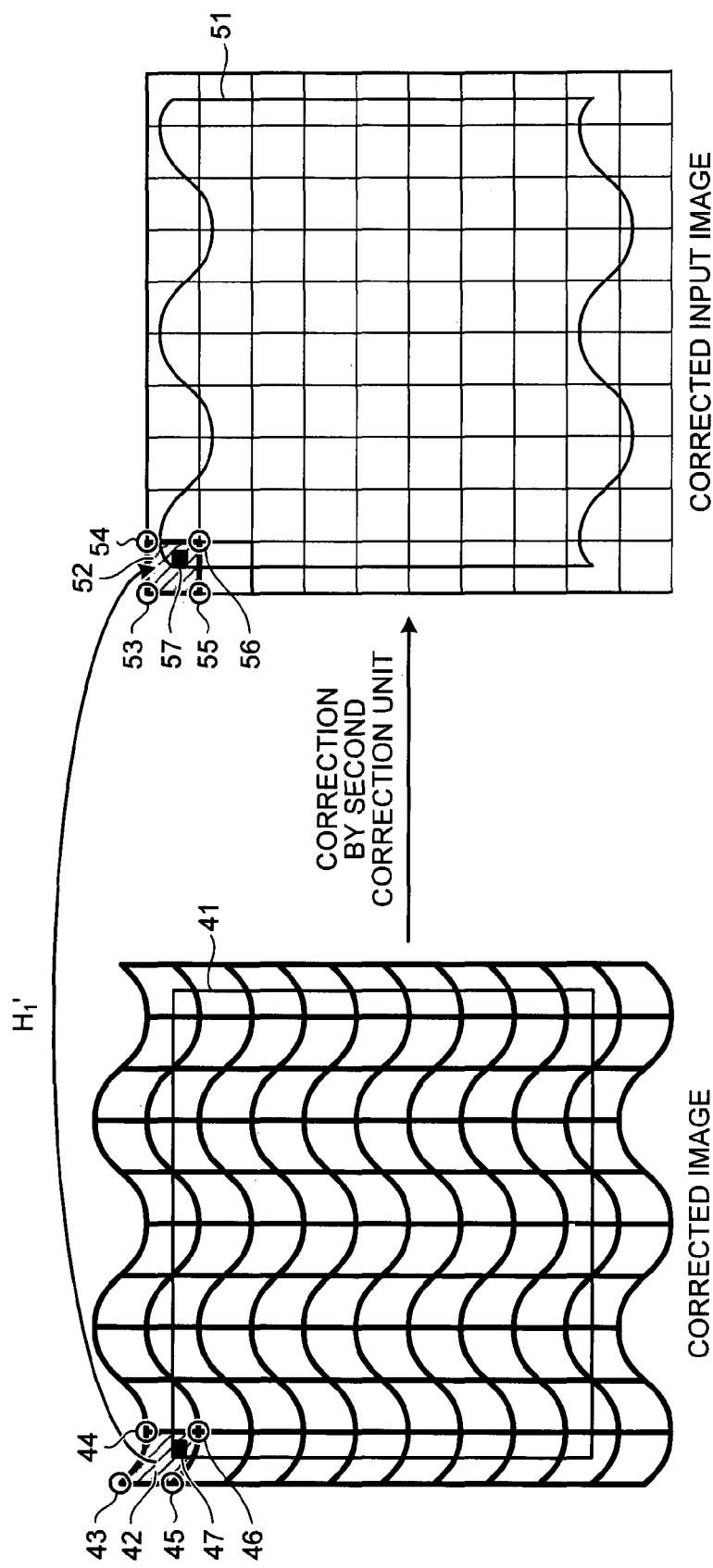
FIG. 12 is a diagram for explaining an example of a correction method used in the second correction unit of the image correction system according to the first embodiment.

The correction region determination unit 341 determines a correction region in the corrected image. FIG. 12 is a diagram for explaining an example of a correction method used in the second correction unit 34 of the image correction system 1 according to the first embodiment. A region 41 in FIG. 12 is an example of the correction region determined by the correction region determination unit 341. The correction region determination unit 341 may determine the region 41 by any method. For example, the correction region determination unit 341 determines, as the correction region, a rectangle having the equal aspect ratio to that of the projection region of the projected image.

Pixel values of an input image are associated with pixel values of the correction region. In general, a correction region is smaller than an input image in size. Thus, the input image needs to be reduced so that the input image is fully displayed on the correction region.

Back to FIG. 11, the corresponding point detection unit 342 detects corresponding points in the pattern image on a corrected input image corresponding to points in a pattern image on the corrected image. For example, in the example of FIG. 12, the corresponding point detection unit 342 associates a point 43 in the corrected image with a point 53 in the corrected input image. The corresponding point detection unit 342 associates a point 44 in the corrected image with a point 54 in the corrected input image. The corresponding point detection unit 342 associates a point 45 in the corrected image with a point 55 in the corrected input image. The corresponding point detection unit 342 associates a point 46 in the corrected image with a point 56 in the corrected input image. Thereby, a unit region 42 in the corrected image is associated with a unit region 52 in the corrected input image.

The projection transformation matrix calculation unit 343 determines a projection transformation matrix $H_n'$ for each unit region n. For example, the projection transformation matrix calculation unit 343 determines the projection transformation matrix $H_n'$ on the basis of Formula 11 obtained by four points detected by the corresponding point detection unit 342.

The corrected input image generation unit 344 determines pixel values of coordinates obtained by applying the projection transformation matrix $H_n'$ to coordinates in the correction region on the basis of pixel values of the coordinates in the correction region to which the projection transformation matrix $H_n'$ is applied. The pixel values are not based on pixel values of the correction region in the corrected image but on pixel values of the input image fitted to the region 41.

For example, the corrected input image generation unit 344 determines a pixel value 57 of the corrected input image on the basis of a pixel value 47 of the input image in a position corresponding to a position in the correction region associated by the projection transformation matrix $H_1'$. The corrected input image generation unit 344 determines a pixel value of a certain point in the corrected input image by the projection transformation matrix $H_n'$. Thereby, the corrected input image generation unit 344 generates a corrected input image 51.

Figure 13:
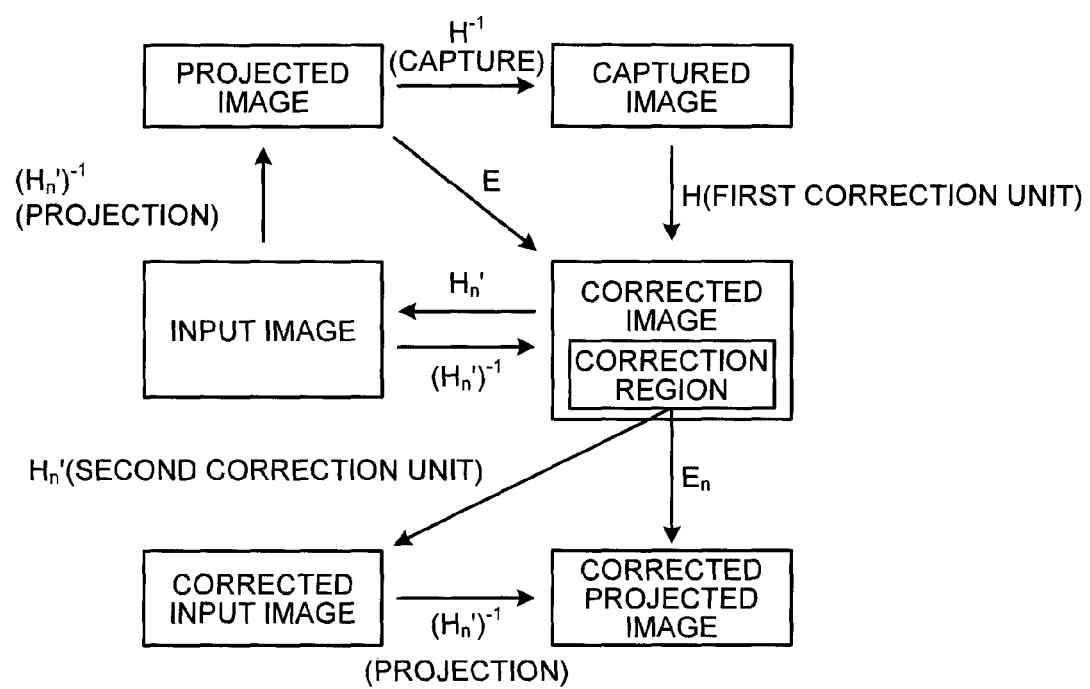
FIG. 13 is a diagram illustrating an example of relations among projection transformation matrices that correspond to projection, image-capturing, and correction by the image correction system according to the first embodiment.

FIG. 13 is a diagram illustrating an example of relations among projection transformation matrices that correspond to projection, image-capturing, and correction by the image correction system 1 according to the first embodiment. Projecting an input image by the projection unit 32 corresponds to the transformation represented by an inverse matrix $(H_n')^{-2}$ that is the inverse of the projection transformation matrix $H_n'$. Capturing a projected image corresponds to the transformation represented by the inverse matrix $H^{-1}$ that is the inverse of the projection transformation matrix H calculated by the first correction unit 33. Therefore, the projected image and the corrected image are identical. That is, a matrix E is the identity matrix.

The second correction unit 34 transforms coordinates of the correction region in the corrected image into coordinates of the corrected input image by the projection transformation matrix $H_n'$. The second correction unit 34 determines pixel values of the coordinates in the corrected input image to be the same pixel values as those in the input image that has been fitted to the correction region. Thus, an image in the correction region and a projected image after correction are identical. That is, a matrix $E_n$ is the identity matrix.

Figure 14:
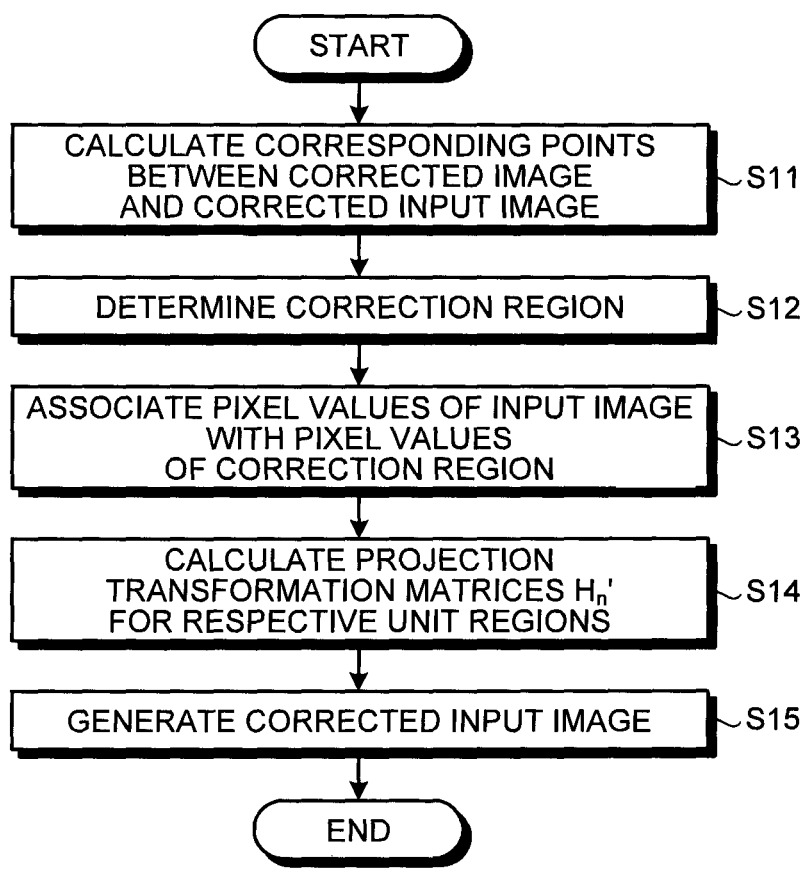
FIG. 14 is a flowchart for explaining an example of a correction method used in the second correction unit of the image correction system according to the first embodiment.

FIG. 14 is a flowchart for explaining an example of a correction method used in the second correction unit 34 of the image correction system 1 according to the first embodiment.

The corresponding point detection unit 342 calculates corresponding points between a corrected image and a corrected input image by using grid points in the grid pattern image (Step S11). This associates unit regions in the corrected image with unit regions in the corrected input image. The correction region determination unit 341 determines a correction region to be corrected by the second correction unit 34 (Step S12). The correction region determination unit 341 associates pixel values of the input image with pixel values of the correction region (Step S13). The projection transformation matrix calculation unit 343 calculates projection transformation matrices for respective unit regions in the correction region (Step S14). The corrected input image generation unit 344 transforms certain coordinates in the correction region in the corrected image into coordinates of the corrected input image by the projection transformation matrix $H_n'$. The corrected input image generation unit 344 generates the corrected input image by determining pixel values of the coordinates in the corrected input image to be the same pixel values as those in the input image that has been fitted to the correction region (Step S15).

Figure 15:
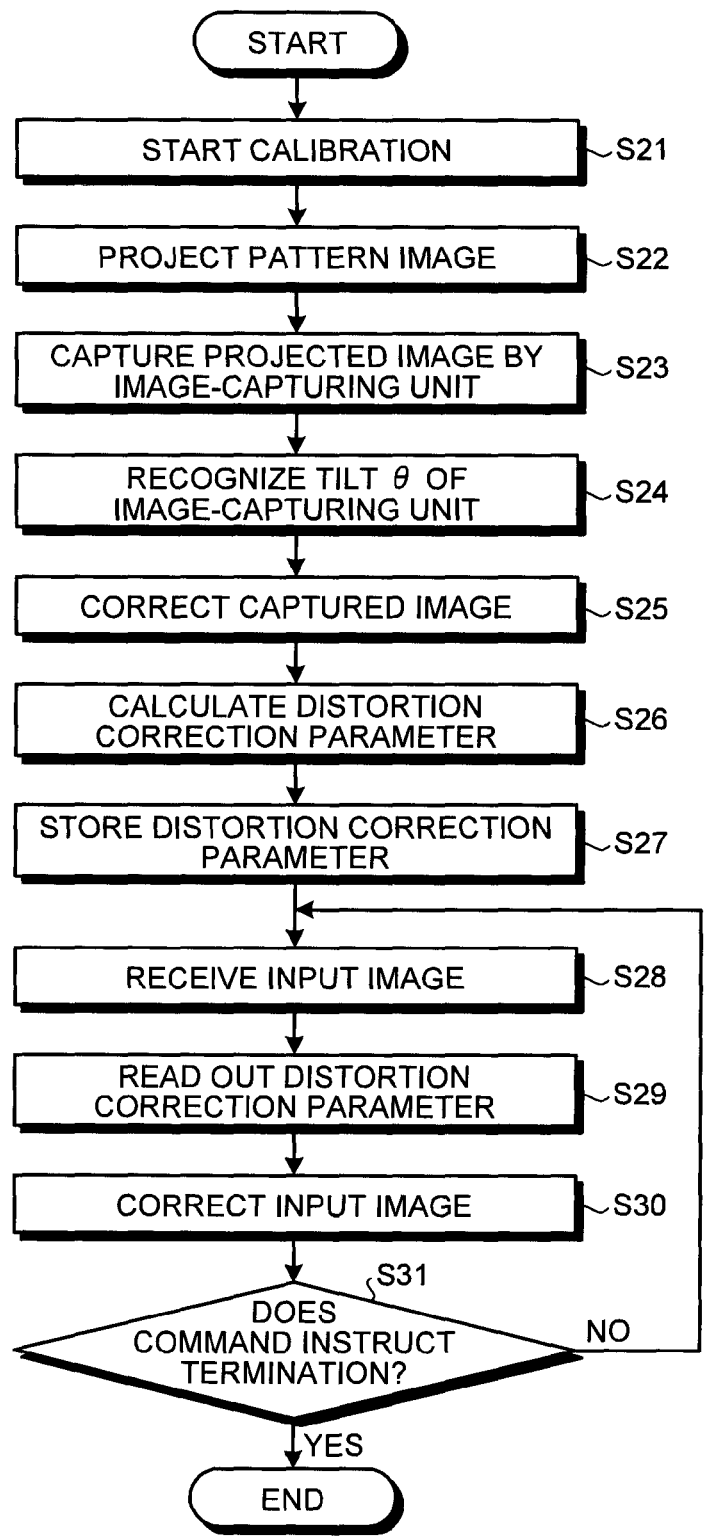
FIG. 15 is a diagram for explaining an operation of the image correction system according to the first embodiment.

FIG. 15 is a diagram for explaining an operation of the image correction system 1 according to the first embodiment.

The controller 31 transmits to the projection unit 32 a signal indicating the start of calibration of a projected image (Step S21). The projection unit 32 projects a pattern image as the projected image on a projection surface (Step S22). The image-capturing unit 21 captures the projected image and acquires a captured image (Step S23). The tilt recognition unit 22 recognizes a tilt θ of the image-capturing unit 21 at the time of capturing at Step S23 (Step S24). The first correction unit 33 generates a corrected image by correcting the captured image on the basis of an intrinsic parameter matrix of the image-capturing unit 21 and the tilt θ recognized at the time of capturing (Step S25).

The second correction unit 34 calculates, as distortion correction parameters, a correction region in the corrected image, and a projection transformation matrix calculated for each unit region and used for transforming a corrected image into a corrected input image (Step S26). The following describes S26 in detail. First, the correction region in the corrected image is described. The correction region in the corrected image will be a projection region in a corrected projected image. Thus, the second correction unit 34 determines an aspect ratio of the correction region to be equal to that of an input image. In general, a corrected projected image (corrected input image) projected on a projection surface corresponding to a correction region in a corrected image is a reduced input image.

Next, described is the projection transformation matrix calculated for each unit region and used for transforming a corrected image into a corrected input image. The second correction unit 34 detects corresponding points between a pattern image on the corrected image and that on the input image. The second correction unit 34 calculates a projection transformation matrix for each unit region defined by line segments joining the corresponding points.

The second correction unit 34 stores the distortion correction parameter into a memory of the image correction system 1 (Step S27). The second correction unit 34 receives an input image from the controller 31 (Step S28). The second correction unit 34 reads out the distortion correction parameter that has been stored at Step S27 from the memory (Step S29). The second correction unit 34 corrects the input image on the basis of the distortion correction parameter (Step S30).

The controller 31 determines whether or not it has received a command that instructs termination of calibration of the projected image (Step S31). When the controller 31 receives a command that instructs termination of calibration (Yes at Step S31), the controller 31 terminates the process. When the controller 31 does not receive a command that instructs termination of calibration (No at Step S31), the process returns to Step S28.

Figure 16:
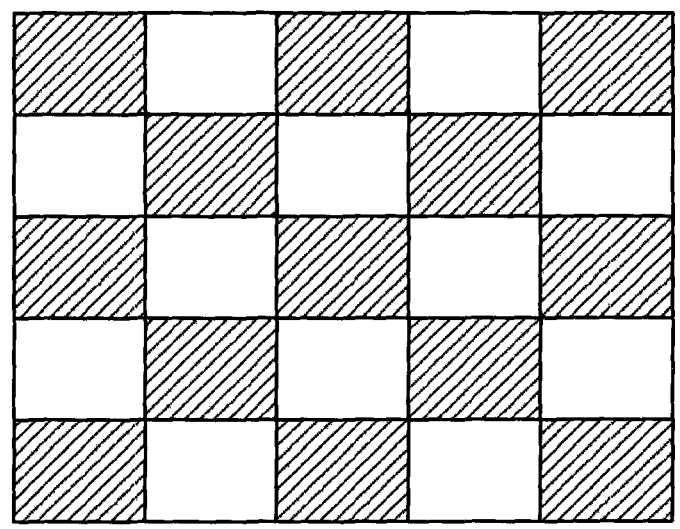
FIG. 16 is a diagram illustrating a first modification of the pattern image projected by the projection unit of the image correction system according to the first embodiment.
Figure 17:
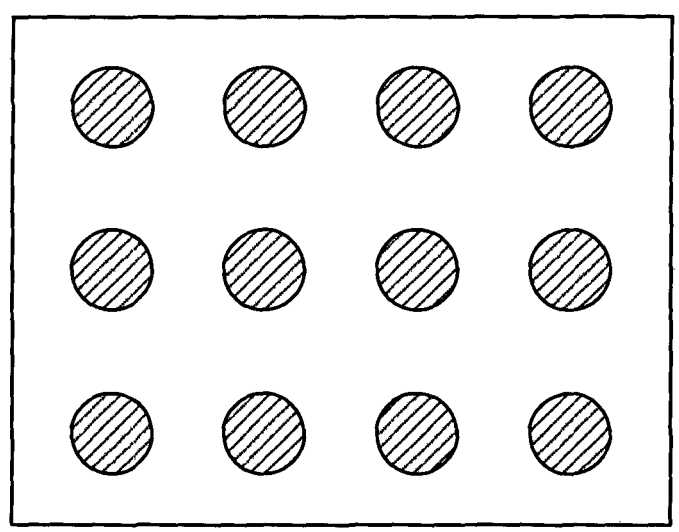
FIG. 17 is a diagram illustrating a second modification of the pattern image projected by the projection unit of the image correction system according to the first embodiment.

The pattern image used in the image correction system 1 according to the first embodiment may be a pattern image other than the grid pattern image. FIG. 16 is a diagram illustrating a first modification of the pattern image projected, by the projection unit 32 of the image correction system 1 of the first embodiment. The example of FIG. 16 illustrates a pattern image of a chessboard pattern. FIG. 17 is a diagram illustrating a second modification of the pattern image projected by the projection unit 32 of the image correction system 1 of the first embodiment. The example of FIG. 17 illustrates a pattern image with circles.

The corresponding point detection unit 342 of the second correction unit 34 may detect corresponding points without using a pattern image. For example, the corresponding point detection unit 342 may apply, to a content image of a user, a corresponding-point extraction method in which scale invariant feature transform (SIFT) is used. When the controller 31 determines that the content image of a user has few image features, the controller 31 may determine not to apply the corresponding-point extraction method by SIFT to the content image. Specifically, the controller 31 may calculate frequencies of content images, and determine not to use a content image with few high-frequency components.

The correction processing by the first correction unit 33 and the second correction unit 34 may be performed in an external computer connected through a network instead of in the projection apparatus 3. The image correction system 1 may be connected with the external computer in either of a wired or wireless manner.

Using an accelerometer is not the only method for the tilt recognition unit 22 to recognize tilt of the image-capturing apparatus 2. For example, the tilt recognition unit 22 may recognize tilt of the image-capturing apparatus 2 on the basis of image processing in which a captured image captured by the image-capturing apparatus 2 is used. In the image processing, for example, the tilt recognition unit 22 may recognize the tilt of the image-capturing apparatus 2 by detecting an upper and a lower black edges of a projection surface (such as a screen) contained in a captured image, and using the ratio of the length of the upper black edge to that of the lower black edge.

Second Embodiment

Figure 18:
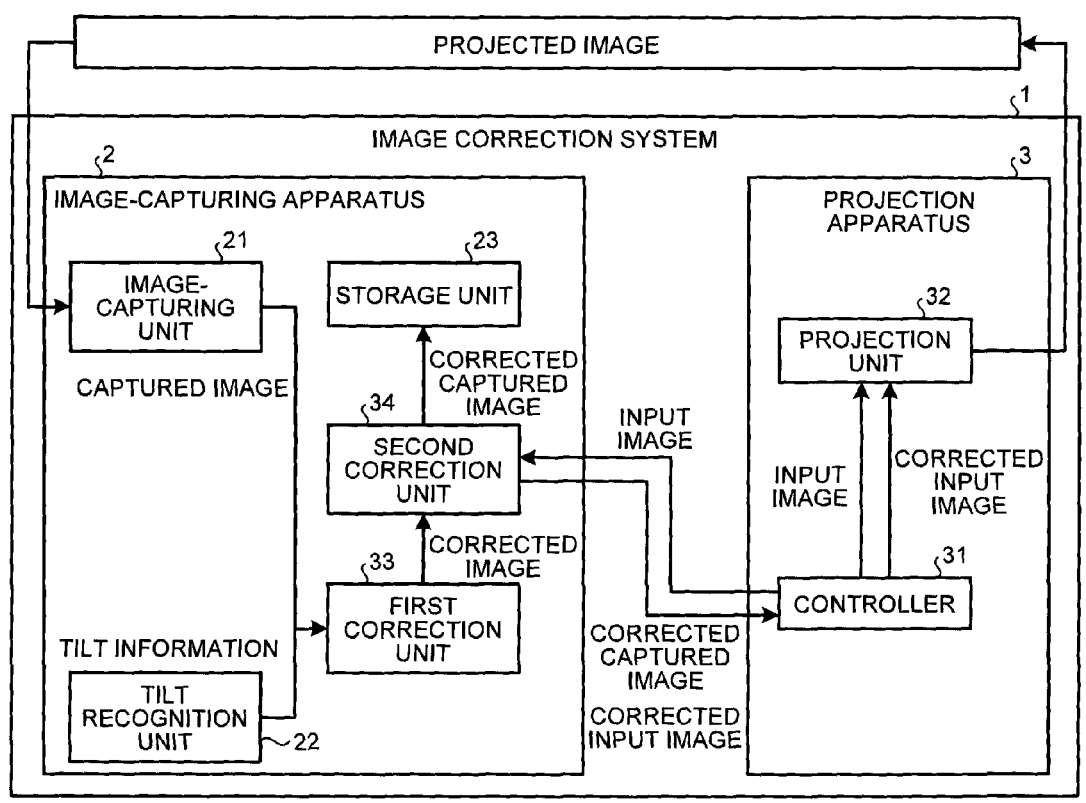
FIG. 18 is a block diagram illustrating an example of a configuration of functional blocks in an image correction system according to a second embodiment.

Next, described is an image correction system 1 according to a second embodiment. FIG. 18 is a block diagram illustrating an example of a configuration of functional blocks in the image correction system 1 of the second embodiment. The image correction system 1 of the second embodiment differs from the image correction system 1 of the first embodiment in that the image-capturing apparatus 2 includes the first correction unit 33 and the second correction unit 34. This allows the projection apparatus 3 to have a simple configuration that includes only basic functions for projection. The image correcting system 1 of the second embodiment also differs in that it includes a storage unit 23 that stores a corrected captured image acquired by correcting non-linear distortion in a corrected image by the second correction unit 34. Detailed description of the operation of the image correction system 1 according to the second embodiment is omitted because the description thereof is the same as that of the operation of the image correction system 1 according to the first embodiment.

In the description of the image correction system 1 of the first embodiment, the projection apparatus 3 projects an image on a screen as a projection surface, and the image-capturing apparatus 2 captures the projection surface, for example. However, the projection surface for the projection apparatus 3 and the subject for the image-capturing apparatus 2 are not limited to a screen. In the description of the image correction system 1 of the second embodiment, described is a case in which the subject of the image-capturing apparatus 2 is not the screen.

Figure 19:
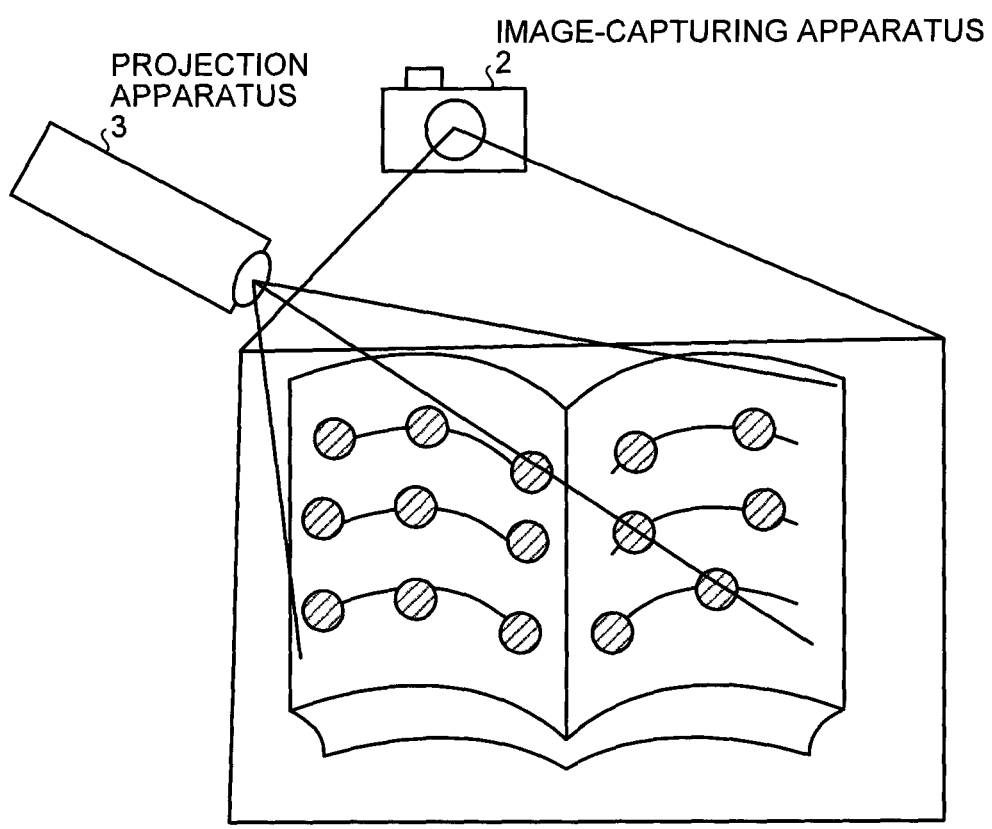
FIG. 19 is a diagram illustrating an example of a subject of an image-capturing apparatus of the image correction system according to the second embodiment.

FIG. 19 is a diagram illustrating an example of a subject of the image-capturing apparatus 2 of the image correction system 1 according to the second embodiment. The example of FIG. 19 illustrates a case in which the projection apparatus 3 projects the pattern image with circles illustrated in FIG. 17 on a book, and the image-capturing apparatus 2 acquires a captured image by capturing the book. Following description is a case of correcting a captured image acquired by capturing a book. First, the image-capturing unit 21 acquires a captured image by capturing a book on which a pattern image is projected. Then, the first correction unit 33 acquires a corrected image by correcting trapezoidal distortion (linear distortion) in the captured image because of the image-capturing apparatus 2 not being directly opposite to the book as the subject when capturing it.

Next, the second correction unit 34 acquires a corrected captured image by correcting non-linear distortion caused by, for example, a bend in the book. Specifically, the second correction unit 34 receives the pattern image illustrated in FIG. 17 as an input image, and calculates the above-described projection transformation matrix $H_n'$ from the input image and the corrected image. In other words, the second correction unit 34 calculates the above-described projection transformation matrix $H_n'$ by establishing correspondences between the circles in the pattern image illustrated in FIG. 17 and the circles in the pattern image contained in the corrected image. The pattern image projected by the projection unit 32 is not limited to the pattern image illustrated in FIG. 17, but any pattern image can be used in order for the second correction unit 34 to calculate the projection transformation matrix $H_n'$. The second correction unit 34 stores projection transformation matrices $H_n'$ for respective regions n (regions including respective circles in the pattern image) in the storage unit 23. Thereby, the second correction unit 34 can correct non-linear distortion identical to the non-linear distortion caused by, for example, a bend in the book illustrated in FIG. 19. For example, the projection transformation matrices $H_n'$ stored in the storage unit 23 can be used in a case in which the subject is a book that has the same shape as that of the book in FIG. 19 and on which the same non-linear distortion occurs as that on the book in FIG. 19.

The second correction unit 34 acquires a corrected captured image by transforming the respective regions n in the corrected image by the projection transformation matrices $H_n'$, and stores the corrected captured image in the storage unit 23. The image-capturing apparatus 2 may transmits the corrected captured image to the projection apparatus 3, and then the projection apparatus 3 may project the corrected captured image. Thereby, when a book is captured as a subject to acquire a captured image, and then the first correction unit 33 and the second correction unit 34 correct the captured image to acquire a corrected captured image, the corrected captured image can be displayed as a projected image on a projection surface such as a screen.

Third Embodiment

Figure 20:
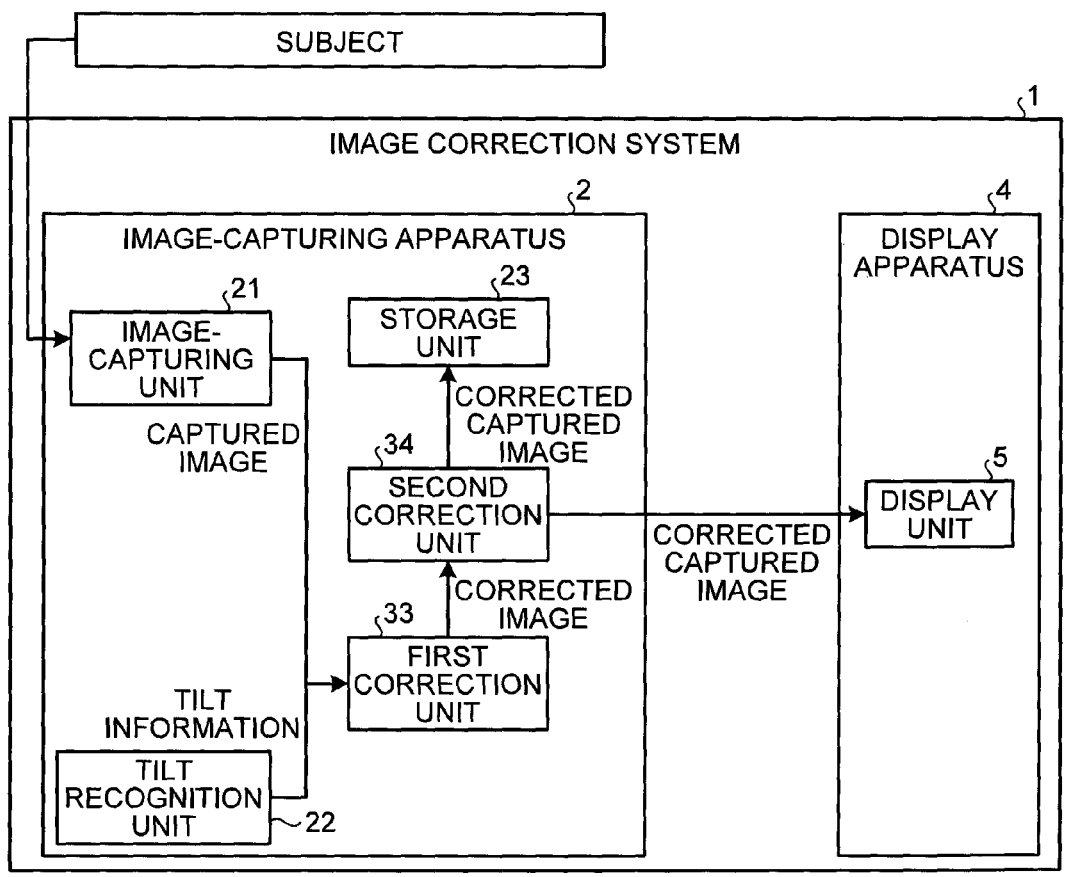
FIG. 20 is a block diagram illustrating an example of a configuration of functional blocks in an image correction system according to a third embodiment.

Next, described is an image correction system 1 according to a third embodiment. FIG. 20 is a block diagram illustrating an example of a configuration of functional blocks in the image correction system 1 of the third embodiment. The image correction system 1 of the third embodiment includes the image-capturing apparatus 2 and a display apparatus 4. The image correction system 1 of the third embodiment differs from the image correction systems 1 of the first and the second embodiments in that it includes the display apparatus 4 instead of the projection apparatus 3. The display apparatus 4 includes a display unit 5 that displays a corrected captured image.

The configuration of the image-capturing apparatus 2 of the image correction system 1 of the third embodiment is the same as that of the second embodiment, and thus the description thereof is omitted. The detailed description of the operation of the image correction system 1 of the third embodiment is also omitted because the description thereof is the same as that of the image correction systems 1 of the first and the second embodiments.

Figure 21:
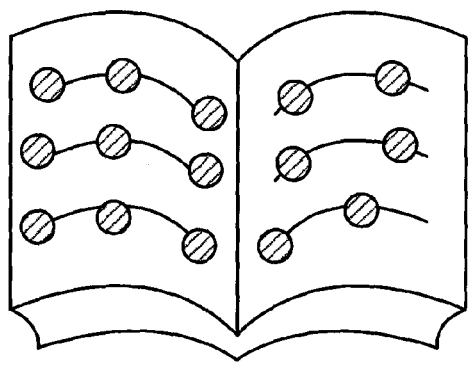
FIG. 21 a diagram illustrating an example of a subject of an image-capturing apparatus of the image correction system according to the third embodiment.
Figure 22:
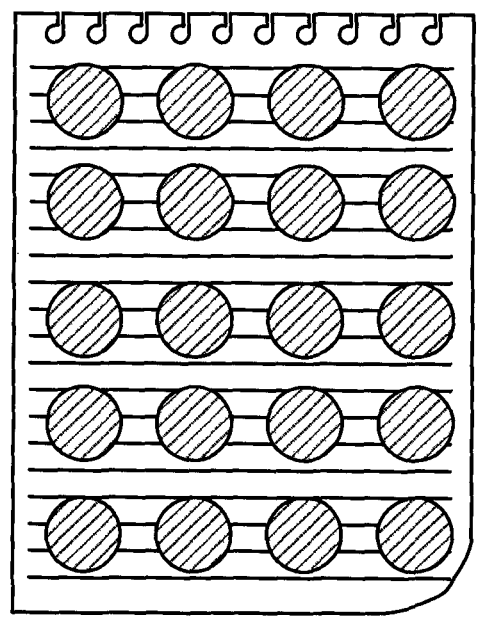
FIG. 22 is a diagram illustrating an example of a subject of the image-capturing apparatus of the image correction system according to the third embodiment.

FIGS. 21 and 22 are diagrams each illustrating an example of a subject of the image-capturing apparatus 2 of the image correction system 1 according to the third embodiment. FIG. 21 is an example of a book containing pages on which a pattern image is printed. FIG. 22 is an example of a sheet of paper on which a pattern image is printed. Following description is an example of a case in which the subject of the image-capturing apparatus 2 is the book illustrated in FIG. 21. It should be noted that the following description is also applicable to a case in which the subject of the image-capturing apparatus 2 is the sheet of paper illustrated in FIG. 22.

First, the image-capturing unit 21 acquires a captured image by capturing a book on which a pattern image is printed. Then, the first correction unit 33 acquires a corrected image by correcting trapezoidal distortion (linear distortion) in the captured image because of the image-capturing apparatus 2 not being directly opposite to the book as the subject when capturing it. The second correction unit 34 reads out the same pattern image as the pattern image printed on the book from the storage unit 23, and then calculates the above-described projection transformation matrix $H_n'$ from the pattern image and the corrected image.

The second correction unit 34 stores, in the storage unit 23, projection transformation matrices $H_n'$ for respective regions n (regions including respective circles in the pattern image) in the corrected image. Thereby, the second correction unit 34 can correct non-linear distortion that is identical to the non-linear distortion caused by, for example, a bend in the book illustrated in FIG. 21. The second correction unit 34 acquires a corrected captured image by transforming the respective regions n in the corrected image by the projection transformation matrices, $H_n'$, and stores the corrected captured image in the storage unit 23. The image-capturing apparatus 2 transmits the corrected captured image to the display apparatus 4 to display the corrected captured image on the display unit 5 of the display apparatus 4. Thereby, when a book is captured as a subject to acquire a captured image, and the first correction unit 33 and the second correction unit 34 corrects the captured image to acquire a corrected captured image, the corrected captured image can be displayed on the display unit 5 of the display apparatus 4.

The tilt recognition unit 22, the controller 31, the first correction unit 33, and the second correction unit 34 of the image correction systems 1 according to the first to the third embodiments may be implemented either by hardware such as an integrated circuit (IC), or by software (computer program). The tilt recognition unit 22, the controller 31, the first correction unit 33, and the second correction unit 34 of the image correction systems 1 of the first to the third embodiments may be implemented by combining hardware and software (computer program).

Figure 23:
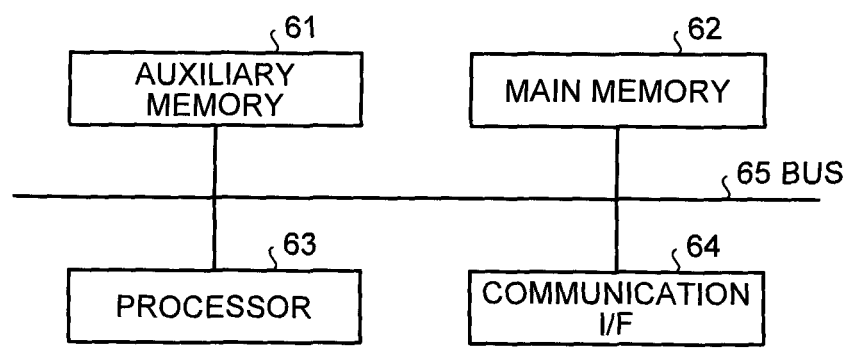
FIG. 23 is a diagram for explaining an example of a hardware configuration to execute software (computer program) in the image correction systems according to the first to the third embodiments.

FIG. 23 is a diagram for explaining an example of a hardware configuration to execute software (computer program) in the image correction systems 1 according to the first to the third embodiments. The image-capturing apparatus 2 of the first to the third embodiments, and the projection apparatus 3 of the first and the second embodiments include an auxiliary memory 61 such as a memory card, a main memory 62 such as a random access memory (RAM), a processor 63 such as a central processing unit (CPU), and a communication interface (I/F) 64 for communicating with other apparatuses. The auxiliary memory 61, the main memory 62, the processor 63, and the communication I/F 64 are connected one another through a bus 65.

The auxiliary memory 61 stores software (computer program). However, the software (computer program) may be provided as a computer program product recorded in a file in an installable or executable format in a recording medium, such as a CD-ROM, a flexible disk (FD), a CD-R, and a digital versatile disk (DVD), that is readable by a computer.

The software (computer program) may be stored on a computer connected to a network such as the Internet, and may be provided by downloading through the network. The software (computer program) may also be provided or distributed through a network such as the Internet.

The processor 63 reads out the software (computer program) stored in the auxiliary memory 61 such as a memory card, a storage medium such as a CD-ROM, or a computer on a network to execute it on the main memory 62. Thereby, when the tilt recognition unit 22, the controller 31, the first correction unit 33, and the second correction unit 34 are implemented by software (computer program), these functional blocks are implemented on the main memory 62.

INDUSTRIAL APPLICABILITY

The image correction systems 1 according to the first to the third embodiments can provide an image correction system, an image correction method and a computer program that can eliminate distortion in a subject contained in a captured image by using the captured image even if the captured image acquired by the image-capturing apparatus 2 capturing the subject is distorted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

EXPLANATION OF LETTERS OR NUMERALS

1 Image correction system
2 Image-capturing apparatus
3 Projection apparatus
4 Display apparatus
5 Display unit
21 Image-capturing unit
22 Tilt recognition unit
23 Storage unit
31 Controller
32 Projection unit
33 First correction unit
34 Second correction unit
331 Intrinsic parameter matrix calculation unit
332 Rotation matrix calculation unit
333 Three-dimensional coordinate calculation unit
334 Projection transformation matrix calculation unit
335 Corrected image generation unit
341 Correction region determination unit
342 Corresponding point detection unit
343 Projection transformation matrix calculation unit
344 Corrected input image generation unit
61 Auxiliary memory
62 Main memory
63 Processor
64 Communication I/F
65 Bus
A Intrinsic parameter matrix
H Projection transformation matrix
$H_1'$ Projection transformation matrix
$H_n'$ Projection transformation matrix
P Perspective projection transformation matrix
$P_1$ Perspective projection transformation matrix
$P_2$ Perspective projection transformation matrix
R Rotation matrix
f Focal length
θ Tilt

The invention claimed is:

1. An image correction system comprising:
an image-capturing unit configured to acquire a captured image by capturing a subject;
a tilt recognition unit configured to recognize tilt of an image-capturing direction of the image-capturing unit relative to an image-capturing direction in which the image-capturing unit being directly opposite to the subject captures the subject;
a first correction unit configured to generate a corrected image by correcting distortion in the captured image on the basis of information indicating the tilt; and
a second correction unit configured to acquire a corrected captured image by correcting non-linear distortion in the corrected image,
wherein the tilt recognition unit recognizes the tilt with an accelerometer.

2. The image correction system according to claim 1, wherein the first correction unit comprises:
a projection transformation matrix calculation unit configured to calculate coordinates of the corrected image corresponding to coordinates of the captured image, and calculate a projection transformation matrix that transforms the coordinates of the captured image into the coordinates of the corrected image; and
a corrected image generation unit configured to generate the corrected image by applying the projection transformation matrix to coordinates of all pixels in the captured image.

3. The image correction system according to claim 2, wherein the first correction unit further comprises:
an intrinsic parameter matrix calculation unit configured to calculate an intrinsic parameter matrix of the image-capturing unit;
a rotation matrix calculation unit configured to calculate a rotation matrix representing coordinate transformation due to the tilt; and
a three-dimensional coordinate calculation unit configured to calculate three-dimensional coordinates corresponding to the coordinates of the captured image by perspective projection transformation in which the coordinates of the captured image, the intrinsic parameter matrix of the image-capturing unit, and the rotation matrix are used, and
the projection transformation matrix calculation unit calculates, from the three-dimensional coordinates, the coordinates of the corrected image corresponding to the coordinates of the captured image by perspective projection transformation in which the intrinsic parameter matrix is used.

4. The image correction system according to claim 1, further comprising:
a projection unit configured to project an image on a projection surface, wherein
the image-capturing unit acquires a captured image by capturing the projected image as the subject;
the second correction unit acquires a corrected projected image by correcting non-linear distortion in the corrected image; and
the projection unit further projects the corrected projected image on the projection surface.

5. The image correction system according to claim 1, wherein the tilt recognition unit recognizes the tilt when the image-capturing unit captures the subject.

6. An image correction method comprising:
acquiring, by an image-capturing unit, a captured image by capturing a subject;
recognizing, by a tilt recognition unit, tilt of an image-capturing direction of the image-capturing unit relative to an image-capturing direction in which the image-capturing unit being directly opposite to the subject captures the subject, the tilt recognition unit recognizing the tilt with an accelerometer;
generating, by a first correction unit, a corrected image by correcting distortion in the captured image on the basis of information indicating the tilt; and
acquiring, by a second correction unit, a corrected captured image by correcting non-linear distortion in the corrected image.

7. A computer program product comprising a non-transitory computer-usable medium having a computer program that causes a computer to function as:

an image-capturing unit configured to acquire a captured image by capturing a subject;
a tilt recognition unit configured to recognize tilt of an image-capturing direction of the image-capturing unit relative to an image-capturing direction in which the image-capturing unit being directly opposite to the subject captures the subject;
a first correction unit configured to generate a corrected image by correcting distortion in the captured image on the basis of information indicating the tilt; and
a second correction unit configured to acquire a corrected captured image by correcting non-linear distortion in the corrected image,
wherein the tilt recognition unit recognizes the tilt with an accelerometer.

* * * * *